United States Patent
Tada et al.

(10) Patent No.: US 8,213,188 B2
(45) Date of Patent: Jul. 3, 2012

(54) BIDIRECTIONAL DC-DC CONVERTER

(75) Inventors: Nobuhiro Tada, Iruma (JP); Hisao Sato, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 413 days.

(21) Appl. No.: 12/664,727

(22) PCT Filed: Jun. 25, 2008

(86) PCT No.: PCT/JP2008/061540
§ 371 (c)(1),
(2), (4) Date: Dec. 15, 2009

(87) PCT Pub. No.: WO2009/001854
PCT Pub. Date: Dec. 31, 2008

(65) Prior Publication Data
US 2010/0182814 A1     Jul. 22, 2010

(30) Foreign Application Priority Data

Jun. 28, 2007 (JP) ................. P2007-171087

(51) Int. Cl.
*H02M 3/335* (2006.01)
(52) U.S. Cl. ...................... 363/16; 363/21.06
(58) Field of Classification Search .............. 363/16–20, 363/21.02, 21.06, 21.12, 21.17, 34, 65, 89, 363/98, 127, 131
See application file for complete search history.

(56) References Cited

U.S. PATENT DOCUMENTS

| | | | | |
|---|---|---|---|---|
| 5,424,932 A | * | 6/1995 | Inou et al. | 363/21.06 |
| 5,745,351 A | * | 4/1998 | Taurand | 363/20 |
| 6,054,674 A | | 4/2000 | Moriguchi et al. | |
| 6,388,898 B1 | * | 5/2002 | Fan et al. | 363/20 |
| 6,683,797 B2 | * | 1/2004 | Zaitsu et al. | 363/16 |
| 6,944,033 B1 | * | 9/2005 | Xu et al. | 363/16 |
| 7,423,889 B2 | * | 9/2008 | Moromizato | 363/21.06 |
| 2005/0270806 A1 | | 12/2005 | Zhu | |
| 2006/0268589 A1 | | 11/2006 | Nakahori | |

FOREIGN PATENT DOCUMENTS

| | | |
|---|---|---|
| JP | 11-187662 | 7/1999 |
| JP | 11-206123 | 7/1999 |
| JP | 2002-165448 | 6/2002 |
| JP | 2006-333667 | 12/2006 |
| JP | 2008-502292 | 1/2008 |

OTHER PUBLICATIONS

International Search Report for PCT/JP2008/061540, mailed Sep. 16, 2008.

* cited by examiner

*Primary Examiner* — Rajnikant Patel
(74) *Attorney, Agent, or Firm* — Nixon & Vanderhye P.C.

(57) ABSTRACT

Provided is a bidirectional DC/DC converter which can control a boost voltage in a wide range. The DC/DC converter includes: three series circuits formed by a first to a sixth switch, each two of which are connected in series between a plus terminal and a minus terminal of a high voltage side; two transformers in which primary windings are connected in series and input terminals of the primary windings are connected to connection points of the switching elements; and a seventh to a tenth switch. The transformers have secondary windings, each of which is divided at the middle point. The middle points are connected to a minus terminal of a low voltage side. Respective terminals of the secondary windings are connected to a plus terminal of the low voltage side by the seventh to the tenth switches.

7 Claims, 9 Drawing Sheets

BIDIRECTIONAL DC-DC CONVERTER

This application is the U.S. national phase of International Application No. PCT/JP2008/061540, filed 25 Jun. 2008, which designated the U.S. and claims priority to Japanese Application No. 2007-171087, filed 28 Jun. 2007, the entire contents of each of which are hereby incorporated by reference.

TECHNICAL FIELD

The present invention relates to a bidirectional DC-DC converter, and more particularly, to a bidirectional DC-DC converter which can change (i.e., decrease or increase) voltages in a wide range of input voltages to provide predetermined output voltages.

Priority is claimed on Japanese Patent Application No. 2007-171087, filed Jun. 28, 2007, the content of which is incorporated herein by reference.

BACKGROUND ART

Usually, a DC-DC converter is configured to unidirectionally increase a voltage from a high-side voltage to a low-side voltage or unidirectionally decrease a voltage from a low-side voltage to a high-side voltage.

Vichcles have two direct-current power supply systems each using a battery with a different voltage value (high-side voltage, low-side voltage).

Accordingly, in vehicles which require high efficiency, it has been proposed to bidirectionally convert voltages between two direct-current power supply systems, that is, from a high voltage to a low voltage, or from a high-side voltage to a low-side voltage, and utilize limited energy efficiently.

In order to mutually supply electric power, a bidirectional DC-DC converter has been employed in which a direct-current voltage increase circuit and a direct-current voltage reduction circuit are arranged in parallel between direct-current power supply systems and are used appropriately (for example, see Patent Document 1).

[Patent Document 1] Japanese Unexamined Patent Application, First Publication No. 2002-165448

DESCRIPTION OF INVENTION

Problem to be Solved by the Invention

In the bidirectional DC-DC converter disclosed in Patent Document 1, however, there are problems in that the voltage value that can be bidirectionally is limited in accordance with a turn ratio of the primary and the secondary sides of the transformer, and especially in that the upper limit of the boost voltage is limited by the voltage value of the low voltage side in a voltage increase process.

For example, in the case where the related art DC-DC converter is configured such that the input voltage of 50V to 100V is decreased to 10V, that is, turn ratio is corresponded to a voltage decrease, the voltage exceeding 50V cannot be generated in a voltage increase.

Accordingly, in the related art examples, if the voltage is to be increased with a turn ratio set to decrease the voltage, it is necessary to separately provide a voltage increase circuit in order to obtain a voltage increased to a desired voltage value. The number of parts thus becomes large and the circuit size increases.

In the voltage increase process, if the voltage value of the boost voltage is to be decreased because of a certain malfunction occurring in the high voltage side, the voltage value cannot be decreased to as low as about 0V.

The present invention is made in view of the circumstance described above. It is an object of the present invention to provide a bidirectional DC-DC converter which has, as compared with related art converters, a wider range of voltage values of a boost voltage without the upper and lower limit values of the voltage value of the boost voltage limited to the voltage values in accordance with turn ratios (the upper limit value is substantially twice the turn ratio and the lower limit value is about 0V) and with which the number of parts can be reduced as compared with the related art converters and a converter circuit can be easily made compact.

Means for Solving the Problem

A bidirectional DC-DC converter according to the present invention converts a voltage between a high voltage side and a low voltage side, and the converter includes: a first transformer which includes a first primary side winding and a first secondary side winding, the first secondary side winding including a first winding and a second winding which are divided at a first midpoint; a second transformer which includes a second primary side winding and a second secondary side winding, the second primary side winding being connected in series to the first primary side winding, and the second secondary side winding being connected in parallel to the first secondary winding and including a third winding and a fourth winding which are divided at a second midpoint; a first switch which is inserted between a positive terminal at the high voltage side and a junction point of one end of the first primary side winding and one end of the second primary side winding; a second switch which is inserted between the junction point and a negative terminal at the high voltage side; a third switch which is inserted between an other end of the first primary side winding and the positive terminal at the high voltage side; a fourth switch which is inserted between the other end of the first primary side winding and the negative terminal at the high voltage side; a fifth switch which is inserted between an other end of the second primary side winding and the positive terminal at the high voltage side; a sixth switch which is inserted between the other end of the second primary side winding and the negative terminal at the high voltage side; a seventh switch which is inserted between a terminal of the first secondary winding at a side of the first winding and a positive terminal at the low voltage side; an eighth switch which is inserted between a terminal of the first secondary winding at a side of the second winding and the positive terminal at the low voltage side; a ninth switch which is inserted between a terminal of the second secondary winding at a side of the third winding and the positive terminal at the low voltage side; and a tenth switch which is inserted between a terminal of the second secondary winding at a side of the fourth winding and the positive terminal at the low voltage side, the first midpoint and the second midpoint being connected to the negative terminal at the low voltage side, and the seventh switch, the eighth switch, the ninth switch and the tenth switch respectively connecting the first terminal, the second terminal, the third terminal and the fourth terminal of the secondary winding to the positive terminal at the low voltage side.

The bidirectional DC-DC converter according to the present invention may further include: a second control circuit which controls the seventh to the tenth switches; and a first rectifier circuit which is connected to the first primary side winding and the second primary side winding, and, in a voltage increase process, the second control circuit may control the seventh and the eighth switches such that a connection between the terminal of the first secondary winding at the side of the first winding and the positive terminal at the low voltage side and a connection between the terminal of the first secondary winding at the side of the second winding and the positive terminal at the low voltage side are changed at every first cycle, and the second control circuit may perform a push-pull operation in order to cause an electric current to flow through the first primary side winding in opposite directions at every first cycle, and the second control circuit may control the ninth and the tenth switches such that a connection between the terminal of the second secondary winding at the side of the third winding and the positive terminal at the low voltage side and a connection between the terminal of the second secondary winding at the side of the fourth winding and the positive terminal at the low voltage side are changed at every second cycle, and the second control circuit may perform a push-pull operation in order to cause an electric current to flow through the second primary side winding in opposite directions at every second cycle so that a direction of the electric current flowing through the second primary side winding is same as a direction of the electric current flowing through the first primary side winding, and the first rectifier circuit may smooth sum of voltages induced in the first primary side winding and the second primary side winding which are outputted from the first rectifier circuit and outputs it as a boost voltage.

In the bidirectional DC-DC converter according to the present invention, the second control circuit may phase-control timings to turn the seventh and the eighth switches on and off, and timings to turn the ninth and the tenth switches on and off so as to set the boost voltage as a predetermined voltage.

In the bidirectional DC-DC converter according to the present invention, the second control circuit may phase-control timings to turn the seventh and the eighth switches on and off, and timings to turn the ninth and the tenth switches on and off through phase control, and may pulse-width control a time period in which each of the seventh to the tenth switches is turned on, so as to set the boost voltage as a predetermined voltage.

The bidirectional DC-DC converter according to the present invention may further include: a first control circuit which controls the first to the sixth switches so as to establish connections between each of the junction point, the second end of the first primary side winding and the second end of the second primary side winding and either of the positive terminal or the negative terminal at the high voltage side; a second rectifier circuit which is connected to the first winding and the second winding; and a third rectifier circuit which is connected to the third winding and the fourth winding, an output of the third rectifier being connected in parallel to an output of the second rectifier circuit, and in a voltage reduction process, the first control circuit may control the first to the sixth switches to turn on and off at every third cycle and may cause electric currents to flow through first primary side winding and the second primary side winding in opposite directions at every third cycle, the second rectifier circuit may rectify voltages generated in the first winding and the second winding, the third rectifier circuit may rectify voltages generated in the third winding and the fourth winding, and the DC-DC converter may smooth and output a voltage output from the second rectifier circuit and the third rectifier circuit.

In the bidirectional DC-DC converter according to the present invention, in the voltage reduction process, the first control circuit may phase-control timings to turn each of the first to the sixth switches on and off in accordance with an output voltage having a decreased voltage so as to set the output voltage as a predetermined low voltage.

In the bidirectional DC-DC converter according to the present invention, in the voltage reduction process, the first control circuit may pulse-width control a time period in which each of the first to the sixth switches is turned on in accordance with an output voltage having a decreased voltage so as to set the output voltage as a predetermined low voltage.

Effect of the Invention

According to the present invention, in a voltage reduction process from a high voltage to a low voltage, a secondary side winding of a first transformer and a secondary side winding of a second transformer are connected in parallel. With this configuration, a predetermined voltage can be obtained in accordance with the turn ratio and by controlling switchings in a similar manner to the related art. Moreover, in a voltage increase process from a low voltage to a high voltage, a primary side winding of the first transformer and a primary side winding of the second transformer are connected in series. With this configuration, a voltages induced in each of the windings are summed (i.e., the sum of the voltages induced in each of the primary windings is obtained). Accordingly, in addition to an increase in voltage in accordance with the turn ratio of the transformer, the voltages induced in each of the primary windings of the two transformers are summed. As a result, the voltage can easily be increased to a high voltage value.

According to an embodiment of the present invention, in the voltage increase process, the primary windings of the first and the second transformers are connected together in series to provide a high boost voltage. In addition, when driving of the secondary windings of each of the first and the second transformers is phase-controlled and the phase is shifted by 180 degrees so as to set the voltage value of the boost voltage to the lower settable value by the phase-control, the time period to turn the seventh to the tenth switches on is pulse-width (PWM) controlled. In this manner, the voltage value of the voltage to be induced can be decreased to 0V. Accordingly, the range of the voltage values of the boost voltage in the voltage increase process can be expanded twice the voltage value corresponding to the turn ratio from 0V. The range of the boost voltage to be output can therefore be significantly extended as compared with the related art DC-DC converters.

According to an embodiment of the present invention, as described above, the primary side windings of the two transformers are connected together in series and the secondary side windings of the two transformers are connected together in parallel (with a switching inserted between the secondary side windings). With this configuration, the output voltage induced in the secondary side windings connected in parallel is used when decreasing the voltage and the output voltage induced in the primary side windings connected in series is used when increasing the voltage. Moreover, the on-off control of the switch is carried out by a combination of the phase-control and the pulse-width control. It is therefore not necessary to separately provide a voltage increase circuit for the boost voltages that cannot be provided by the turn ratio as in the related art. Therefore, according to the embodiment of the present invention, a wider range of the boost voltages can be controlled as compared with the related art converters, the number of parts can be reduced as compared with the related art converters and the converter can be made compact and can be produced at a lower cost.

REFERENCE SYMBOLS 1, 2 Transformers
1L, 2L Primary side windings
1LL, 2LL Leakage inductors
1A, 1B, 2A, 2B Secondary side windings
3 Primary side orthogonal transforming section
4 Secondary side orthogonal transforming section
5 First control circuit
6 Second control circuit

| | |
|---|---|
| B1, B2 | Batteries |
| D3, D4, D5, D6, D7, D8, D9, D10, D11, D12 | Diodes |
| Q3, Q4, Q5, Q6, Q7, Q8, Q9, Q10, Q11, Q12 | Transistors |

BEST MODE FOR CARRYING OUT THE INVENTION

Figure 1:
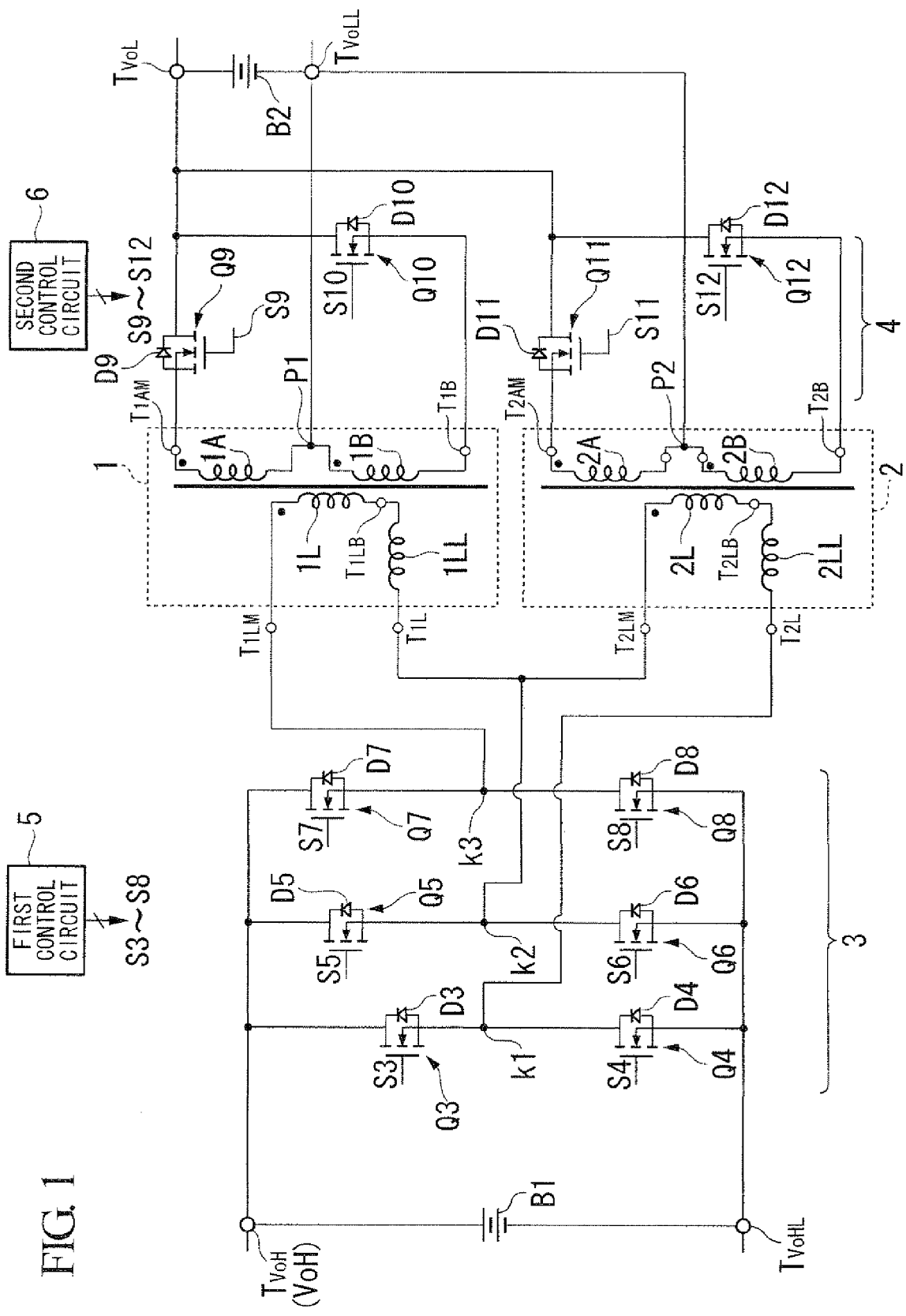
FIG. 1 illustrates an exemplary configuration of a bidirectional DC-DC converter according to an embodiment of the present invention.

Hereinafter, a bidirectional DC-DC (direct current/direct current) converter according to an embodiment of the present invention will be described with reference to the drawings. FIG. 1 is a block diagram illustrating a configuration of the embodiment.

The DC-DC converter according to an embodiment of the present invention is used to control a decrease in a voltage value. In particular, as illustrated in FIG. 1, the decrease in the voltage value is controlled by supplying energy to one of a battery B1 of high voltage $V_{oH}$ and a battery B2 of low voltage $V_{oL}$ whose voltage value has been decreased from the other of the batteries in order to compensate for the decrease in the voltage value.

In FIG. 1, the bidirectional DC-DC converter according to the present embodiment once converts the direct-current low voltage $V_{oL}$ of the battery B2 into a single-phase rectangular wave alternating electric current voltage by a secondary side orthogonal transforming section 4 in the voltage conversion (i.e., energy conversion) of a voltage increase process. A primary side orthogonal transforming section 3 rectifies the single-phase rectangular wave alternating electric current voltage and converts the voltage into a direct-current high voltage $V_{oH}$.

On the other hand, the bidirectional DC-DC inverter once converts the direct-current high voltage $V_{oH}$ in the battery B1 into a single-phase rectangular wave alternating electric current voltage by the primary side orthogonal transforming section 3 in energy conversion in a voltage reduction process. The secondary side orthogonal transforming section 4 rectifies the single-phase rectangular wave alternating electric current voltage and converts the voltage into a direct-current low voltage $V_{oL}$.

In FIG. 1, the primary side orthogonal transforming section 3 is constituted by N-channel MOS transistors (hereinafter, referred to as transistors) Q3, Q4, Q5, Q6, Q7 and Q8 and a first control circuit 5. The primary side orthogonal transforming section 3 is configured as an inverter.

Drains of the transistors Q3, Q5 and Q7 are connected to a positive terminal $T_{VoH}$ of the high-voltage battery B1.

Sources of the transistors Q4, Q6 and Q8 are connected to a negative terminal $T_{VoHL}$ of the high-voltage battery B1.

The source of the transistor Q3 is connected to a drain of the transistor Q4 at a junction point K1. The source of the transistor Q5 is connected to a drain of the transistor Q6 at a junction point K2. The source of the transistor Q7 is connected to a drain of the transistor Q8 at a junction point K3.

Control signals S3, S4, S5, S6, S7 and S8 from the first control circuit 5 are input to gates of the transistors Q3, Q4, Q5, Q6, Q7 and Q8, respectively.

The first control circuit 5 outputs each control signal at a "H" level or a "L" level so as to control the direction of electric currents that flow through a primary side winding 1L and a primary side winding 2L in opposite directions at every predetermined cycle. In this manner, the single-phase rectangular wave alternating electric current voltage is applied to each of the primary side winding 1L of the transformer 1 and the primary side winding 2L of the transformer 2.

The secondary side orthogonal transforming section 4 is constituted by N-channel MOS transistors (hereinafter, referred to as transistors) Q9, Q10, Q11 and Q12 and a second control circuit 6.

Drains of the transistors Q9 and Q10 are connected to a positive terminal $T_{VoL}$ of a low-voltage battery.

Similarly, drains of the transistors Q11 and Q12 are connected to the positive terminal $T_{VoL}$ of the low-voltage battery.

A source of the transistor Q9 is connected to a terminal $T_{1AM}$ (i.e., one end of the secondary side winding of the transformer 1) of a winding 1A in the transformer 1. A control signal S9 is input to a gate of the transistor Q9 from the second control circuit 6.

A source of the transistor Q10 is connected to a terminal $T_{1B}$ of a winding 1B in the transformer 1 (i.e., the other end of the secondary side winding of the transformer 1). A control signal S10 is input to a gate of the transistor Q10 from the second control circuit 6.

A source of the transistor Q11 is connected to a terminal $T_{2AM}$ of a winding 2A in the transformer 2 (i.e., one end of the secondary side winding of the transformer 2). A control signal S11 is input to a gate of the transistor Q11 from the second control circuit 6.

A source of transistor Q12 is connected to a terminal $T_{2B}$ of a winding 2B in the transformer 2 (i.e., the other end of the secondary side winding of the transformer 2). A control signal S12 is input to a gate of the transistor Q12 from the second control circuit 6.

The second control circuit 6 performs both the phase-control and the pulse-width modulation (PWM) control in the voltage increase process. In the phase-control, the second control circuit 6 changes a phase of a cycle in which each of the transistors Q9 and Q10 is turned on and off and a phase of a cycle in which each of the transistors Q11 and Q12 is turned on and off. In the PWM control, the second control circuit 6 changes a pulse width with which the transistor is turned on. The second control circuit 6 controls the voltage induced in the primary side windings 1L and 2L which are connected together in series through a push-pull operation of the transistors Q9 and Q10 and of the transistors Q11 and Q12 by performing the phase-control and the PWM control in order to increase the voltage having a voltage value of a boost voltage. That is, it controls to set the high voltage as a predetermined voltage value.

That is, the second control circuit 6 performs a phase-control to change the phase of a cycle in which the control signals S9 and S10 are changed to a "H" level or to a "L" level and the phase of a cycle in which the control signals S11 and S12 are changed to a "H" level or to a "L" level so as to control the voltage value of the boost voltage.

In addition, the second control circuit 6 performs the PWM control of the pulse width which turns each of the transistors Q9 to Q12 on in order to more reduce the lower limit value of the voltage value of the boost voltage by the phase-control, when the switching phases of the control signals S9 and S10 and of the control signals S11 and S12 are shifted by 180 degrees.

As described above, in the secondary side orthogonal transforming section 4, a compound switch comprised by the transistors Q9 to Q12 is configured as an inverter which generates two single-phase rectangular wave alternating electric current voltages.

As will be described in detail later, in correspondence with the above-described single-phase rectangular wave alternating electric current voltage, the primary side orthogonal transforming section 3 adds the voltages induced in the primary side winding 1L and the primary side winding 2L at the same phase on the basis of the electric current which flows through the windings 1A and 1B of the secondary side winding and through the windings 2A and 2B of the secondary side winding, and then it performs single-phase full-wave rectification on the voltages to generate the high voltage $V_{oH}$.

The primary side orthogonal transforming section 3 rectifies the single-phase rectangular wave alternating electric current voltage induced between the serially connected primary side windings 1L and 2L through full bridge rectification by each of parasitic diodes D3 to D8 of each of the transistors Q3 to Q8.

In the voltage increase process, as described below, another rectification method may be employed instead of the full bridge rectification. That is, synchronizing with the switching of the transistors Q9 to Q12 described above, the first control circuit 5 may rectify the single-phase rectangular wave alternating electric current voltage induced in the primary windings 1L and 2L through synchronous rectification that turns the transistors Q3 to Q8 on and off.

In the primary side orthogonal transforming section 3, a compound switch comprised by the transistors Q3 to Q8 is configured as an inverter which generates two single-phase rectangular wave alternating electric current voltages.

As will be described in detail later, in correspondence with the above-described single-phase rectangular wave alternating electric current voltage, the secondary side orthogonal transforming section 4 performs single-phase full-wave rectification on the voltages induced in the windings 1A and 1B which are the secondary side winding and in the windings 2A and 2B in the secondary side winding at phases opposite to each other on the basis of the electric current which flows through the primary side windings 1L and 2L, and thereby the low voltage $V_{oL}$ is generated.

The secondary side orthogonal transforming section 4 rectifies the single-phase rectangular wave alternating electric current voltage induced in the windings 1A and 1B in the secondary side winding by performing midpoint (i.e., a center tap) both-wave rectification by the parasitic diodes D9 and D10 of the transistors Q9 and Q10, which will be described later.

Similarly, the secondary side orthogonal transforming section 4 rectifies the single-phase rectangular wave alternating electric current voltage induced in the secondary windings 2A and 2B by performing midpoint both-wave rectification by the parasitic diodes D11 and D12 of the transistors Q11 and Q12, which will be described later.

In a voltage reduction process, as illustrated below, other method may also be employed instead of the midpoint both-wave rectification. That is, synchronizing with the switching of the transistors Q3 to Q8 described above, the second control circuit 6 may rectify the single-phase rectangular wave alternating electric current voltage induced in the windings 1A, 1B, 2A and 2B of the secondary side winding through the synchronous rectification that turns the transistors Q9 to Q12 on and off.

That is, the first control circuit 5 controls the voltage value of the low voltage to be decreased by controlling the phases of the control signals S3 and S4 and the phases of the control signals S7 and S8 to be changed with respect to the phases of the control signals S5 and S6. These control signals S5 and S6 are the control signals applied to the gates of the transistors Q5 and Q6 corresponding to the junction point K2. The control signals S3 and S4 are the control signals applied to the gates of the transistors Q3 and Q4 corresponding to the junction point K1. Control signals S7 and S8 are the control signals applied to the gates of the transistors Q7 and Q8 corresponding to the junction point K3. The cycles in which the control signals S3 and S4, the control signals S5 and S6 and the control signals S7 and S8 are the "H" level or the "L" level are of the same length.

The transformer 1 are constituted by the primary side winding 1L, and the secondary side winding having the windings 1A and 1B divided at a midpoint (center tap) P1. In the transformer 1, the turn ratios between the primary side winding 1L and each of the windings 1A and 1B of the secondary side winding are N:1, for example. The midpoint P1 is connected to a negative terminal $T_{V_{oLL}}$ of the battery B2. A leakage inductor 1LL is serially inserted in the primary side winding 1L. The leakage inductor 1LL is connected to the primary side winding 1L via the terminal $T_{1LB}$.

Similarly, the transformer 2 is constituted by the primary side winding 2L, and the secondary side winding having the windings 2A and 2B which are divided in a midpoint P2. In the transformer 2, the turn ratios between the primary side winding 2L and each of the windings 2A and 2B of the secondary side winding are N:1, for example, as in the transformer 1. The midpoint P2 is connected to the negative terminal $T_{V_{oLL}}$ of the battery B2.

A leakage inductor 2LL is serially inserted in the primary side winding 2L. The leakage inductor 2LL is connected to the primary side winding 2L via a terminal $T_{2LB}$. In the present embodiment, no choke coil is used in the primary side orthogonal transforming section 3 or in the secondary side orthogonal transforming section 4. In order to smooth the voltage, leakage inductors 1LL and 2LL of the primary side windings of the transformers 1 and 2 which are described above are used in the present embodiment. The leakage of the transformer may be used as the leakage inductors 1LL and 2LL as described above or they may be provided separately. When the leakage of the transformer is used, the number of parts can be reduced.

In the primary side orthogonal transforming section 3, the junction point K2 is connected to the terminal $T_{1L}$ of the leakage inductor 1LL connected to the primary side winding 1L, and to the terminal $T_{2LM}$ of the primary side winding 2L.

The junction point K3 is connected to the terminal $T_{1LM}$ of the primary side winding 1L. The junction point K1 is connected to the terminal $T_{2L}$ of the leakage inductor 2LL connected to the primary side winding 2L.

The primary side winding 1L of the transformer 1 and the primary side winding 2L of the transformer 2 are connected in series between the junction point K3 and the junction point K1 with the leakage transformers 1LL and 2LL being configured to be inserted therebetween.

As described above, the secondary side orthogonal transforming section 4 has a different configuration from the primary side orthogonal transforming section 3 in which the primary side windings 1L and 2L are connected in series. In the secondary side orthogonal transforming section 4, outputs of the secondary side winding of the transformer 1 and the secondary side winding of the transformer 2 are connected in parallel via each of the transistors Q9, Q10, Q11 and Q12.

Accordingly, in the bidirectional DC-DC converter according to the present embodiment, when the voltage is increased from a low voltage to a high voltage, in addition that the voltage is increased in accordance with the turn ratio of the transformers, the voltages induced in each of the serially connected windings of the two transformers are summed. Accordingly, the voltage is increased efficiently.

The DC-DC converter according to the present embodiment performs not only the phase-control of the timing to turn on and off the transistors Q9, Q10, Q11 and Q12 as switches, but also the PWM control of the pulse width which turns each transistor on. Accordingly, the lower limit of the voltage value of the boost voltage by the phase control can be further lowered to about 0V by the PWM control.

Accordingly, the DC-DC converter according to the present embodiment can control the boost voltage in the voltage increase process in a range of the voltage value from $V_1$ ($V_1$: the low voltage $V_{oL}$×the turn ratio×2) to 0V.

On the other hand, the bidirectional DC-DC converter according to the present embodiment can perform a voltage reduction process similar to that of the related art when the voltage is reduced from the high voltage to the low voltage, since the secondary side windings are connected in parallel.

The voltage increase process by the bidirectional DC-DC converter according to the present embodiment will be described with reference to FIGS. 2 and 3A to 3C. FIGS. 3A to 3C are timing charts illustrating a voltage increase process from a low voltage to a high voltage by the bidirectional DC-DC converter according to the present embodiment. The voltage increase process from a low voltage to a high voltage is a process to convert a voltage of about several volts to a voltage equal to or greater than 100V, for example. The secondary side orthogonal transforming section 4 performs a voltage increase process by conducting phase control. The primary side orthogonal transforming section 3 performs full bridge rectification with respect to the single-phase rectangular wave alternating electric current voltages $V_a$ and $V_b$ induced in the primary side windings 1L and 2L. A high voltage is thus generated. At this time, the first control circuit 3 outputs control signals S3 to S8 of the "L" level to the transistors Q3 to Q8. Accordingly, all the transistors Q3 to Q8 are kept off.

Figure 2:
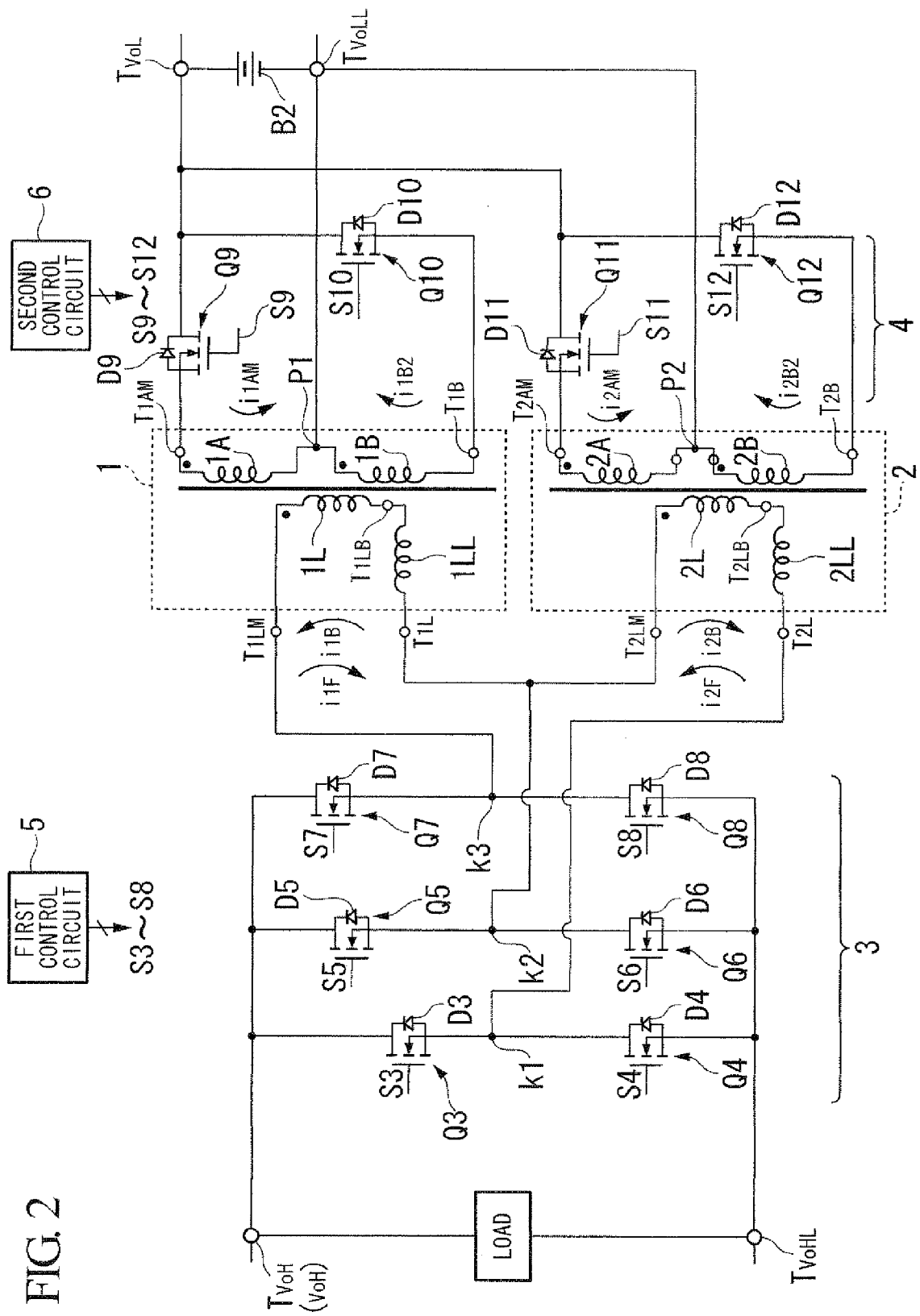
FIG. 2 illustrates a voltage increase process of the bidirectional DC-DC converter illustrated in FIG. 1.
Figure 3A:
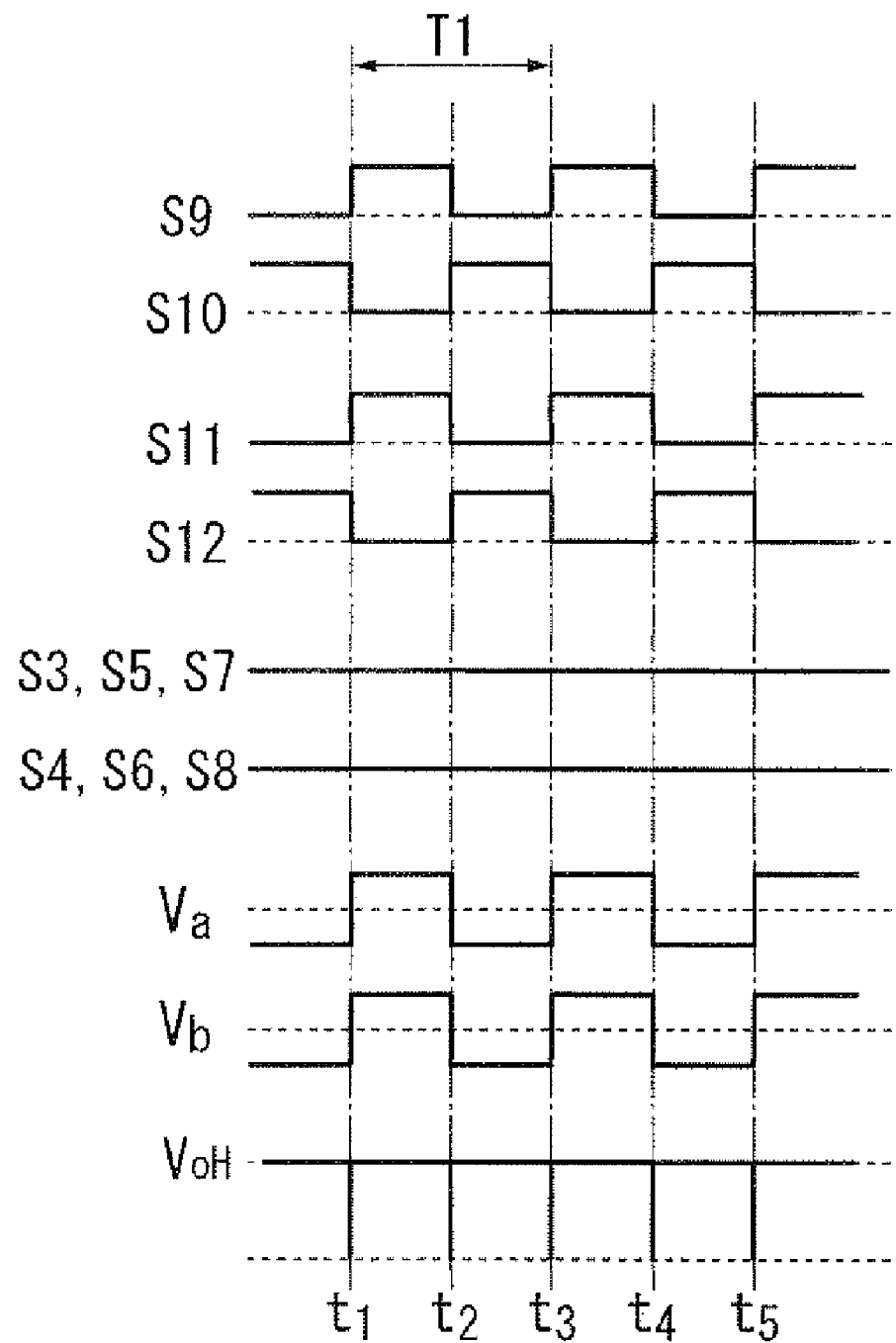
FIG. 3A is a timing chart illustrating the voltage increase process of the bidirectional DC-DC converter illustrated in FIG. 1.
Figure 3B:
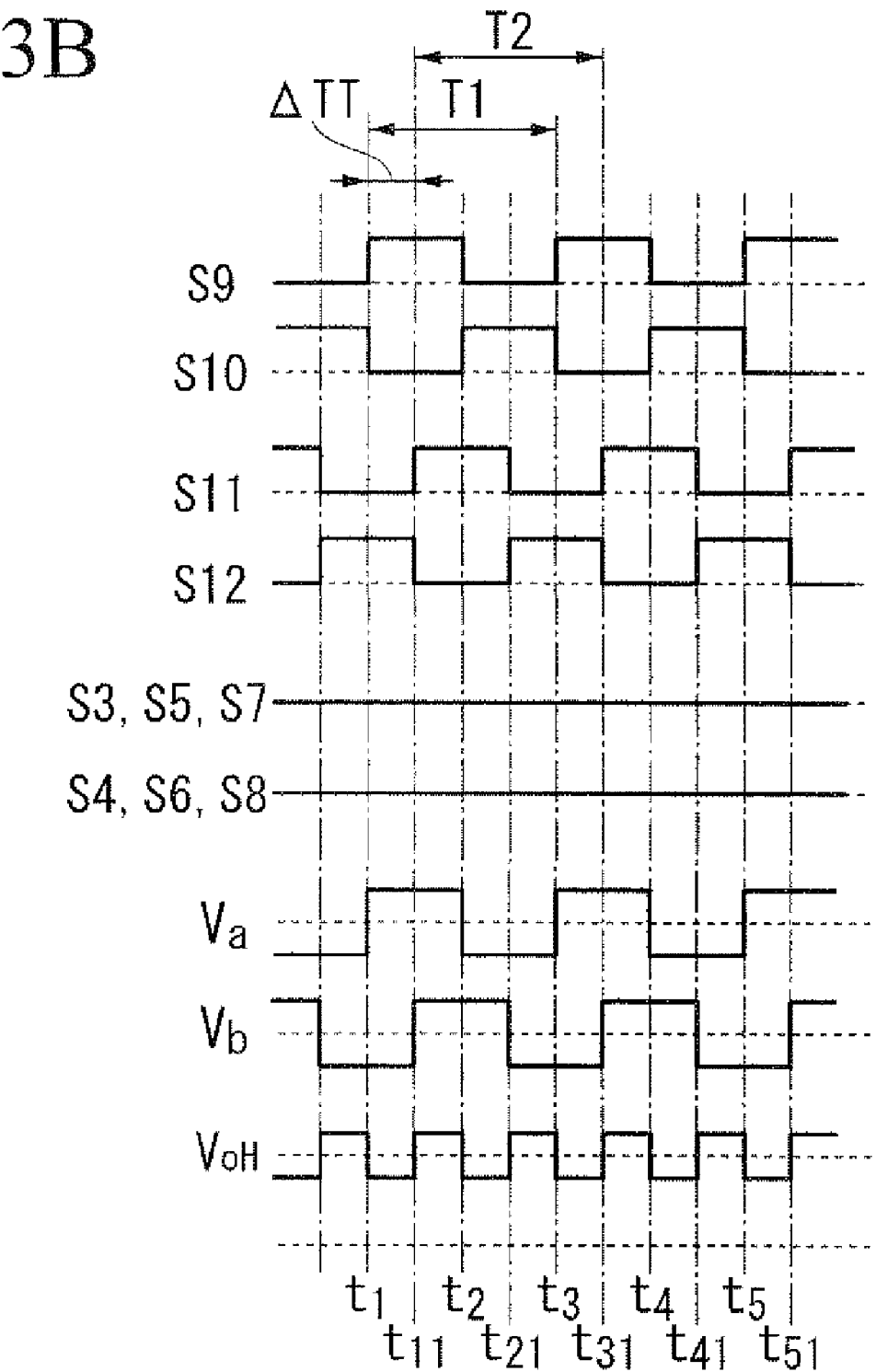
FIG. 3B is a timing chart illustrating the voltage increase process of the bidirectional DC-DC converter illustrated in FIG. 1.
Figure 3C:
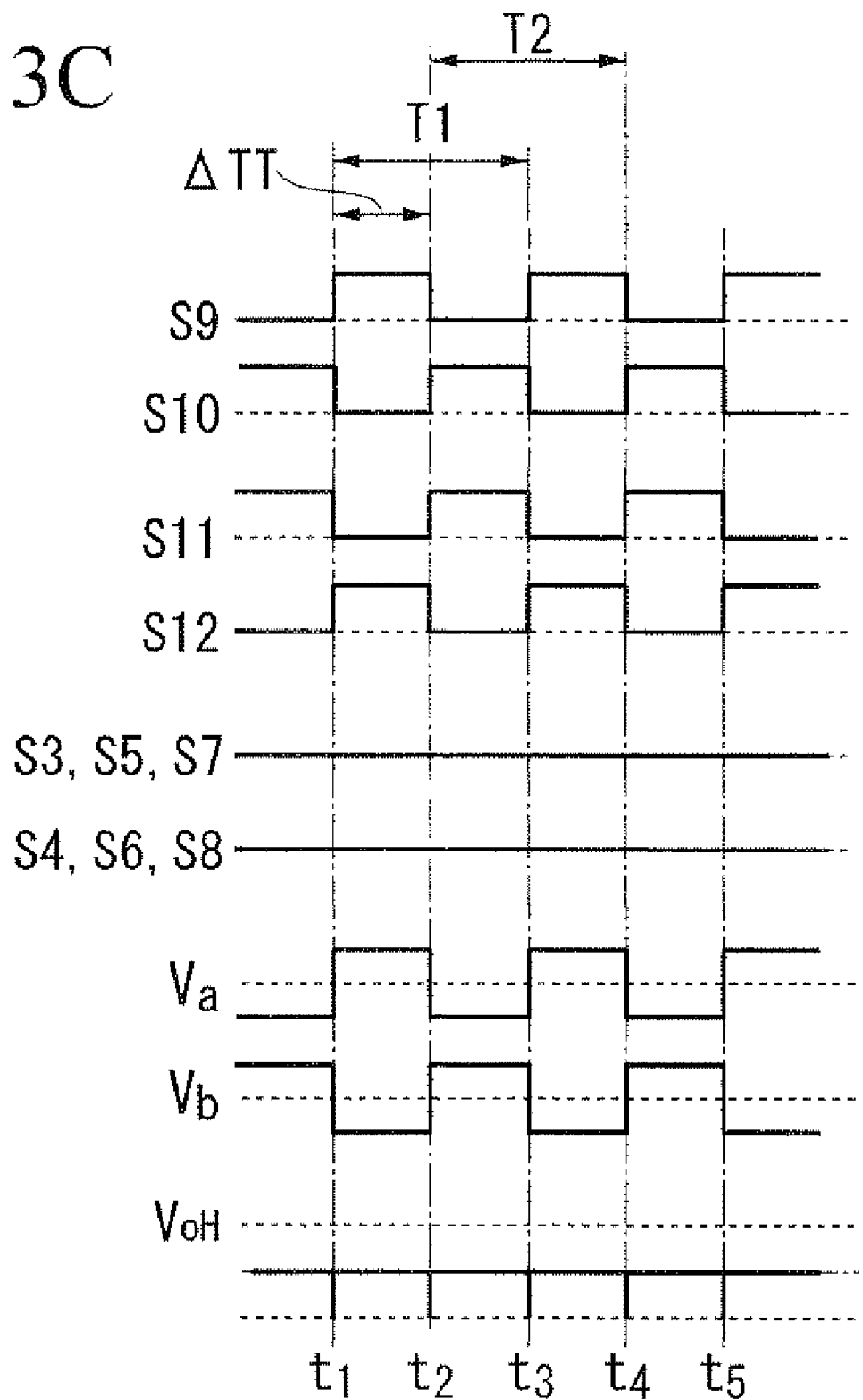
FIG. 3C is a timing chart illustrating the voltage increase process of the bidirectional DC-DC converter illustrated in FIG. 1.

FIG. 2 illustrates a configuration in which load is inserted between the positive terminal $T_{VoH}$ and the negative terminal $T_{VoHL}$ instead of the battery B1 to perform the voltage increase process. The battery B2 of low voltage $V_{oL}$ which compensates for energy is connected to the secondary side orthogonal transforming section 4. In the following description, the rectification process is performed through bridge rectification to single-phase rectangular wave alternating electric current voltages $V_a$ and $V_b$ induced in the primary side windings 1L and 2L in the full bridge configuration of the diodes D3 to D8. As described above, the rectification process may be performed by a method of rectifying the single-phase rectangular wave alternating electric current voltages $V_a$ and $V_b$ induced in the primary side windings 1L and 2L in the synchronous rectification.

In FIGS. 3A to 3C used in the following description, a switching cycle in which the transistors Q9 and Q10 are turned on and off is referred to as a cycle T1. The switching cycle in which the transistors Q10 and Q11 are turned on and off is referred to as a cycle T2. A phase shift between the cycles T1 and T2 is referred to as ΔTT.

<A Case in which Phases of Drive Control of the Transformers 1 and 2 of the Secondary Side Orthogonal Transforming Section 4, i.e., Phases of the Cycles T1 and T2, are the same (ΔTT=0): FIG. 3A>

At the time $t_1$, the second control circuit 6 changes the control signals S9 and S11 from the "L" level to the "H" level (the transistors are driven by the control signals of the same phase), and changes the control signals S10 and S12 from the "H" level to the "L" level.

When the control signals are thus changed, the transistors Q9 and Q11 are turned on and the transistors Q10 and Q12 are turned off.

Accordingly, the electric current $i_{1AM}$ flows into the winding 1A in the secondary side winding of the transformer 1 from an unillustrated low-voltage battery (i.e., the low-voltage battery B2 illustrated in FIG. 2) (in FIG. 2, from the terminal $T_{1AM}$ to the midpoint P1). Moreover, similarly, the electric current $i_{2AM}$ flows into the winding 2A in the secondary side winding of the transformer 2 from the low-voltage battery B2 (in FIG. 2, from the terminal $T_{2AM}$ to the midpoint P2).

Accordingly, the electric current $i_{1B}$ flows through the primary side winding 1L, and a voltage corresponding to the turn ratio of the transformer 1 is induced between the terminals $T_{1LM}$ and $T_{1L}$ at both ends of the primary side winding 1L. Similarly, the electric current $i_{2F}$ flows through the secondary side winding 2L, and a voltage corresponding to the turn ratio of the transformer 2 is induced between the terminals $T_{2LM}$ and $T_{2L}$ at both ends of the primary side winding 2L.

For example, if the turn ratios of both the transformers 1 and 2 are N:1, a voltage of N×$V_{oL}$ (voltage value $V_1$: N×$V_{oL}$) will be induced between the terminals $T_{1LM}$ and $T_{1L}$ and between the terminals $T_{2LM}$ and $T_{2L}$.

Since the primary side winding 1L and the primary side winding 2L are connected in series, a voltage (voltage value $V_2$: 2×N×$V_{oL}$) is generated between the terminals $T_{1LM}$ and $T_{2L}$ at both ends of the serially-connected windings.

The voltage (the voltage between the junction point K3 and the junction point K1, a voltage value $V_2$: 2×N×$V_{oL}$) induced in the primary windings 1L and 2L is smoothed by leakage inductors 1LL and 2LL and is output as a high voltage $V_{oH}$ from a positive terminal $T_{VoH}$ and a negative terminal $T_{VoHL}$ via the diodes D7 and D4.

At the time $t_2$, the second control circuit 6 changes the control signals S10 and S12 from the "L" level to the "H" level (the transistors are driven by the control signals of the same phase) and changes the control signals S9 and S11 from the "H" level to the "L" level.

When the control signals are thus changed, the transistors Q10 and Q12 are turned on and the transistors Q9 and Q11 are turned off.

In this manner, the electric current $i_{1B2}$ flows into the winding 1B in the secondary side winding of the transformer 1 (in FIG. 2, from the terminal $T_{1B}$ to the midpoint P1). Moreover, the electric current $i_{2B2}$ flows into the winding 2B in the secondary side winding of the transformer 2 (in FIG. 2, from the terminal $T_{2B}$ to the midpoint P2).

Accordingly, the electric current $i_{1F}$ flows into the primary side winding 1L and a voltage corresponding to the turn ratio of the transformer 1 having a polarity opposite to that of the voltage induced at the time $t_1$ is induced between the terminals $T_{1LM}$ and $T_{1L}$ at both ends of the primary side winding 1L. Similarly, the electric current $i_{2B}$ flows into the primary side winding 2L, and the voltage corresponding to the turn ratio of the transformer 2 having a polarity opposite to that of the voltage induced at the time $t_1$ is induced between the terminals $T_{2LM}$ and $T_{2L}$ at both ends of the primary side winding 2L.

Since the primary side winding 1L and the primary side winding 2L are serially connected together, a voltage (voltage value $V_2$: $2 \times N \times V_{oL}$) is generated between the terminal $T_{2L}$ and the terminal $T_{1LM}$ connected in series at both ends of the winding (the generated voltage has a polarity opposite to that of the voltage induced at the time $t_1$).

The voltage (the voltage between the junction point K1 and the junction point K3, a voltage value $V_2$: $2 \times N \times V_{oL}$) induced in the primary windings 1L and 2L is smoothed by the leakage inductors 1LL and 2LL and is output as a high voltage $V_{oH}$ from the positive terminal $T_{VoH}$ and the negative terminal $T_{VoHL}$ via the diodes D3 and D8.

Regarding the times $t_3$ to $t_5$, similar operations as those for the times $t_1$ and $t_2$ will be repeated. A process is conducted in which the voltages induced in the primary side windings 1L and 2L of the transformers 1 and 2 are summed and thereby the voltage is increased from the low voltage to the high voltage.

In the case of FIG. 3A described above, since the phases of the control signals which drive each of the secondary windings of the transformers 1 and 2 are the same, the voltages induced in the primary windings 1L and 2L completely overlap at the same phase. Accordingly, in the primary side orthogonal transforming section 3, the single-phase full-wave rectification is performed at high efficiency and the high voltage of the maximum voltage value is generated.

<A Case in which Phases of Drive Control of the Transformers 1 and 2 of the Secondary Side Orthogonal Transforming Section 4, i.e., Phases of the Cycles T3 and T4, are Shifted by 90 Degrees ($\Delta TT=90$): FIG. 3B>

Before the time $t_1$, the second control circuit 6 outputs the control signals S9 and S11 at the "L" level and outputs the control signals S10 and S12 at the "H" level. At this time, the transistors Q10 and Q12 are turned on and the transistors Q9 and Q11 are turned off.

At the time $t_1$, the second control circuit 6 changes the control signal S9 from the "L" level to the "H" level and changes the control signal S10 from the "H" level to the "L" level.

By changing the control signals in this way, the transistor Q9 is turned on and the transistor Q10 is turned off. At this time, the transistor Q11 is turned of and the transistor Q12 is turned on.

As a result, the electric current $i_{1AM}$ flows into the winding 1A in the secondary side winding of the transformer 1. Moreover, the electric current $i_{2B2}$ flows into the winding 2B in the secondary side winding of the transformer 2.

Accordingly, the electric current $i_{1B}$ flows into the primary side winding 1L and a voltage corresponding to the turn ratio of the transformer 1 is induced between the terminals $T_{1LM}$ and $T_{1L}$ at both ends of the primary side winding 1L. On the other hand, the electric current $i_{2B}$ flows into the primary side winding 2L and a voltage corresponding to the turn ratio of the transformer 2 is induced between the terminals $T_{2LM}$ and $T_{2L}$ at both ends of the primary side winding 2L.

For example, if the turn ratios of both the transformers 1 and 2 are N:1, voltages of opposite polarity (voltage value $V_1$: $N \times V_{oL}$) will be induced between the terminals of the primary windings 1L and 2L.

As a result, the voltage (voltage value $V_1$: $N \times V_{oL}$) induced in the primary winding 1L is smoothed by the leakage inductor 1LL and is output as the high voltage $V_{oH}$ from the positive terminal $T_{VoH}$ and the negative terminal $T_{VoHL}$ via the diodes D7 and D6.

Similarly, the voltage (voltage value $V_1$: $N \times V_{oL}$) induced in the primary winding 2L is smoothed by the leakage inductor 2LL and is output as the high voltage $V_{oH}$ from the positive terminal $T_{VoH}$ and the negative terminal $T_{VoHL}$ via the diodes D3 and D6.

At the time $t_{11}$, the second control circuit 6 changes the control signal S11 from the "L" level to the "H" level and changes the control signal S12 from the "H" level to the "L" level.

Accordingly, the transistor Q11 is turned on and the transistor Q12 is turned off. As a result, the electric current $i_{2AM}$ flows into the winding 2A and the voltage (voltage value $V_1$: $N \times V_{oL}$) of the same polarity as that of the primary side winding 1L is induced in the primary side winding 2L.

Since the transistor Q9 is turned on, the electric current $i_{1AM}$ flows into the winding 1A and the electric current $i_{1B}$ flows into the primary side winding 1L, and a voltage (voltage value $V_1$: $N \times V_{oL}$) is induced.

Since the primary side winding 1L and the primary side winding 2L are connected in series, the voltage (voltage value $V_2$: $2 \times N \times V_{oL}$) is generated between the terminal $T_{1LM}$ and the terminal $T_{2L}$ at both ends of the windings which are connected in series.

The voltage (the voltage between the junction point K3 and the junction point K1, the voltage value $V_2$: $2 \times N \times V_{oL}$) induced in the primary windings 1L and 2L is smoothed by the leakage inductors 1LL and 2LL and is output as the high voltage $V_{oH}$ from the positive terminal $T_{VoH}$ and the negative terminal $T_{VoHL}$ via the diodes D7 and D4.

At the time $t_2$, the second control circuit 6 changes the control signal S9 from the "H" level to the "L" level and changes the control signal S10 from the "L" level to the "H" level.

By changing the control signals in this way, the transistor Q10 is turned on and the transistor Q9 is turned off.

Accordingly, the electric current $i_{1B2}$ flows into the winding 1B in the secondary side winding of the transformer 1. On the other hand, the electric current $i_{2AM}$ having the opposite polarity as that of the electric current $i_{1B2}$ flows into the winding 2A in the secondary side winding of the transformer 2.

Accordingly, the electric current $i_{2F}$ flows into the primary side winding 2L and the voltage (voltage value $V_1$: $N \times V_{oL}$) corresponding to the turn ratio of the transformer 2 is induced between the terminal $T_{2LM}$ and the terminal $T_{2L}$ at both ends of the primary side winding 2L. On the other hand, the electric current $i_{1F}$ flows into the primary side winding 1L and the voltage (voltage value $V_1$: $N \times V_{oL}$) having a polarity opposite to that of the voltage induced in the primary winding 2L is induced.

As a result, the voltage induced in the primary winding 1L (voltage value $V_1$: $N \times V_{oL}$) is smoothed by the leakage inductor 1LL and is output as the high voltage $V_{oH}$ from the positive terminal $T_{VoH}$ and the negative terminal $T_{VoHL}$ via the diodes D5 and D8.

Similarly, the voltage (voltage value $V_1$: $N \times V_{oL}$) induced in the primary winding 2L is smoothed by the leakage inductor 2LL and is output as the high voltage $V_{oH}$ from the positive terminal $T_{VoH}$ and the negative terminal $T_{VoHL}$ via the diodes D5 and D4.

At the time $t_{21}$, the second control circuit 6 changes the control signal S11 from the "H" level to the "L" level and changes the control signal S12 from the "L" level to the "H" level.

Accordingly, the transistor Q11 is turned off and the transistor Q12 is turned on. As a result, the electric current $i_{2B2}$ flows into the winding 2A, the electric current $i_{2B}$ flows into the primary side winding 2L, and the voltage (voltage value $V_1$: $N \times V_{oL}$) of the same polarity as that of the primary side winding 2L is induced in the primary side winding 2L.

Since the transistor Q10 has been turned on, the electric current $i_{1B2}$ flows into the winding 1B, the electric current $i_{1F}$ flows into primary winding 1L and the voltage (voltage value $V_1$: $N \times V_{oL}$) has been induced in the primary side winding 1L.

Since the primary side winding 1L and the primary side winding 2L are connected in series, the voltage (voltage value $V_2$: $2 \times N \times V_{oL}$) is generated between the terminal $T_{2L}$ and the terminal $T_{1LM}$ at both ends of the windings which are connected in series.

The voltage (i.e., the voltage between the junction point K3 and the junction point K1, a voltage value $V_2$: $2 \times N \times V_{oL}$) induced in the primary side windings 1L and 2L is smoothed by the leakage inductors 1LL and 2LL and is output as the high voltage $V_{oH}$ from the positive terminal $T_{VoH}$ and the negative terminal $T_{VoHL}$ via the diodes D7 and D4.

Regarding the times $t_3$ to $t_{51}$, similar operations as those at the times $t_1$ and $t_{21}$ are repeated. That is, the voltages induced in the primary side winding 1L of the transformer 1 and the primary side winding 2L of the transformer 2 are summed to increase the voltage value from the low voltage to the high voltage.

In the case of FIG. 3B described above, since the phases of the control signals driving the secondary windings of each of the transformer 1 and the transformer 2 are shifted by 90 degrees, the voltages induced in the primary side winding 1L and primary side winding 2L overlap with the phase shifted by 90 degrees. Accordingly, a period of the same phase in which the voltage value becomes the voltage value $V_2$ ($V_2$: $2 \times N \times V_{oL}$) of the voltage $V_{oH}$ is reduced to half the length as compared with the case of FIG. 3A. Accordingly, in the primary side orthogonal transforming section 3, during each period in which the voltage value of the voltage between the positive terminal $T_{VoH}$ and the negative terminal $T_{VoHL}$ becomes the voltage value $V_2$ ($V_2$: $2 \times N \times V_{oL}$) and the voltage value $V_1$ ($V_1$: $N \times V_{oL}$), the voltage is smoothed in accordance with the inductance of the leakage inductors 1LL and 2LL.
<A Case in which Phases of Drive Control of the Transformers 1 and 2 of the Secondary Side Orthogonal Transforming Section 4, i.e., Phases of the Cycles T1 and T2, are Shifted by 180 Degrees ($\Delta TT=180$): FIG. 3C>

Before the time $t_1$, the second control circuit 6 outputs the control signals S9 and S12 at the "L" level and outputs the control signals S10 and S11 at the "H" level. Accordingly, at this time, the transistors Q10 and Q11 are turned on and the transistors Q9 and Q12 are turned off.

At the time $t_1$, the second control circuit 6 changes the control signals S9 and S12 from the "L" level to the "H" level and changes the control signals S10 and S11 from the "H" level to the "L" level.

By changing the control signals in this way, the transistors Q9 and Q12 are turned on and the transistors Q10 and Q11 are turned off.

Accordingly, the electric current $i_{1AM}$ flows into the winding 1A in the secondary side winding of the transformer 1 and the electric current $i_{2B2}$ flows into the winding 2B in the secondary side winding of the transformer 2.

Accordingly, the electric current $i_{1B}$ flows into the primary side winding 1L and the voltage corresponding to the turn ratio of the transformer 1 is induced between the terminal $T_{1LM}$ and the terminal $T_{1L}$ at both ends of the primary side winding 1L. On the other hand, the electric current $i_{2B}$ flows into the primary side winding 2L and the voltage corresponding to the turn ratio of the transformer 2 is induced between the terminal $T_{2LM}$ and the terminal $T_{2L}$ at both ends of the primary side winding 2L.

For example, if the turn ratios of both the transformers 1 and 2 are N:1, the voltages of opposite polarity (voltage value $V_1$: $N \times V_{oL}$) will be induced between the terminals of each of the primary windings 1L and the primary windings 2L.

Accordingly, the voltage induced in the primary winding 1L (voltage value $V_1$: $N \times V_{oL}$) is smoothed by the leakage inductor 1LL and is output as the high voltage $V_{oH}$ from the positive terminal $T_{VoH}$ and the negative terminal $T_{VoHL}$ via the diodes D7 and D6.

Similarly, the voltage (voltage value $V_1$: $N \times V_{oL}$) induced in the primary winding 2L is smoothed by the leakage inductor 2LL and is output as the high voltage $V_{oH}$ from the positive terminal $T_{VoH}$ and the negative terminal $T_{VoHL}$ via the diodes D3 and D6.

At the time $t_2$, the second control circuit 6 changes the control signals S9 and S12 from the "H" level to the "L" level and changes the control signals S10 and S11 from the "L" level to the "H" level.

By changing the control signals in this way, the transistors Q10 and Q11 are turned on and the transistors Q9 and S12 are turned off.

Accordingly, the electric current $i_{1B2}$ flows into the winding 1B in the secondary side winding of the transformer 1. On the other hand, the electric current $i_{2AM}$ having a polarity opposite to that of the electric current $i_{1B2}$ flows into the winding 2A in the secondary side winding of the transformer 2.

Accordingly, the electric current $i_{2F}$ flows into the primary side winding 2L and the voltage (voltage value $V_1$: $N \times V_{oL}$) corresponding to the turn ratio of the transformer 2 is induced between the terminal $T_{2LM}$ and the terminal $T_{2L}$ at both ends of the primary side winding 2L. On the other hand, the electric current $i_{1F}$ flows into the primary side winding 1L and the voltage (voltage value $V_1$: $N \times V_{oL}$) corresponding to the turn ratio of the transformer 2 is induced between the terminal $T_{1LM}$ and the terminal $T_{1L}$ at both ends of the primary side winding 1L. The voltage induced in the primary side winding 1L and the voltage induced in the primary side winding 2L have opposite polarities.

Thus, the voltage (voltage value $V_1$: $N \times V_{oL}$) induced in the primary winding 1L is smoothed by leakage inductor 1LL and is output as the high voltage $V_{oH}$ from the positive terminal $T_{VoH}$ and the negative terminal $T_{VoHL}$ via the diodes D5 and D8.

Similarly, the voltage (voltage value $V_1$: $N \times V_{oL}$) induced in the primary winding 2L is smoothed by the leakage inductor 2LL and is output as the high voltage $V_{oH}$ from the positive terminal $T_{VoH}$ and the negative terminal $T_{VoHL}$ via the diodes D5 and D4.

Regarding the times $t_3$ to $t_5$, similar operations as those in the times $t_1$ and $t_2$ are repeated. That is, a process is performed in which the voltages induced in the primary side winding 1L of the transformer 1 and the primary side winding 2L of the transformer 2 are summed to increase the voltage value from the low voltage to the high voltage.

Figure 4:
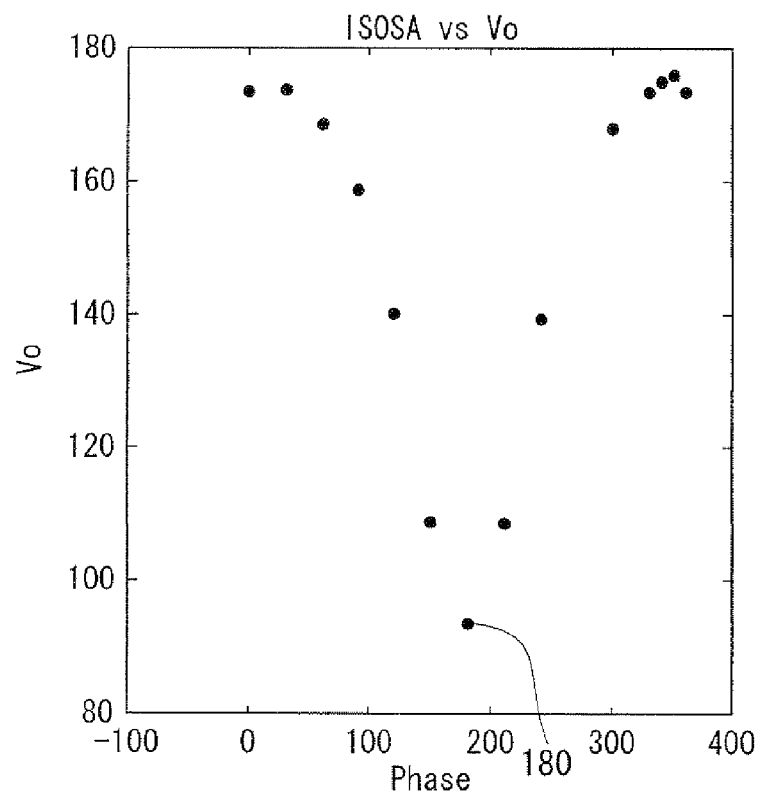
FIG. 4 illustrates a simulation result of the voltage increase process of the bidirectional DC-DC converter illustrated in FIG. 1.

When the phases of the cycle T1 and cycle T2 are shifted by 180 degrees, the boost voltage of the lower voltage value determined from the turn ratio can be obtained in a state in which phases of the voltages are controlled so as not to generate voltages of the same polarity in the primary side windings 1L and 2L, as shown in FIG. 4. In FIG. 4, the horizontal axis represents an angle of the phase shift of the cycles T1 and T2 and the vertical axis represents the voltage value of the boost voltage of the positive terminal $T_{VoH}$ and the negative terminal $T_{VoHL}$. FIG. 4 illustrates a simulation result with the low voltage $V_{oL}$ being 100V and the turn ratio of the primary side with respect to the secondary side being 9:1.

Figure 5:
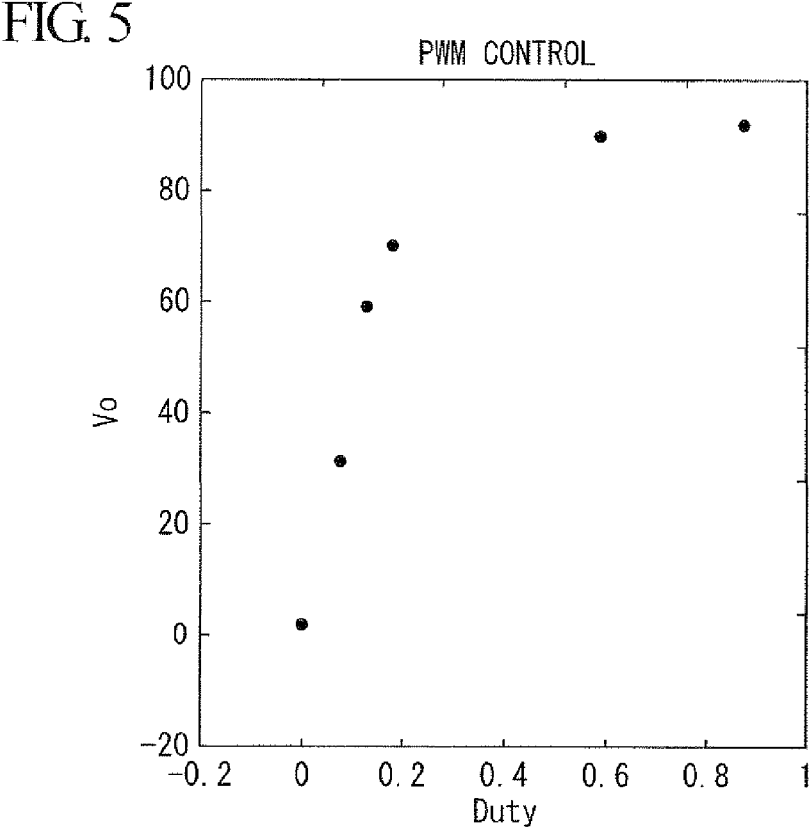
FIG. 5 illustrates a simulation result of the voltage increase process of the bidirectional DC-DC converter illustrated in FIG. 1.

However, in order to set the lower limit value of the boost voltage equal to or not greater than the lower limit value corresponding to the turn ratio, the pulse width of the "H" level which turns each transistor on is PWM-controlled with the phases of the cycle T1 and cycle T2 being shifted by 180 degrees. Accordingly, the voltage value of the boost voltage can be the lower limit lower than the value determined in accordance with the turn ratio. That is, the boost voltage can be controlled to 0V by setting the pulse width to be "0" as illustrated in FIG. 5. In FIG. 5, the horizontal axis represents the duty and the vertical axis represents the voltage values of the boost voltages of the positive terminal $T_{VoH}$ and the negative terminal $T_{VoHL}$.

As described above, the voltage value of the boost voltage can be arbitrarily controlled in a wide range between the upper limit (i.e., the voltage value of $V_2$: $2 \times N \times V_{oL}$ if the phases of the cycles T1 and T2 are the same) and the lower limit (i.e., the voltage value of 0V if the phases of the cycles T1 and T2 are shifted by 180 degrees and the length of time to turn the transistor on is "0") of the boost voltage.

Figure 6:
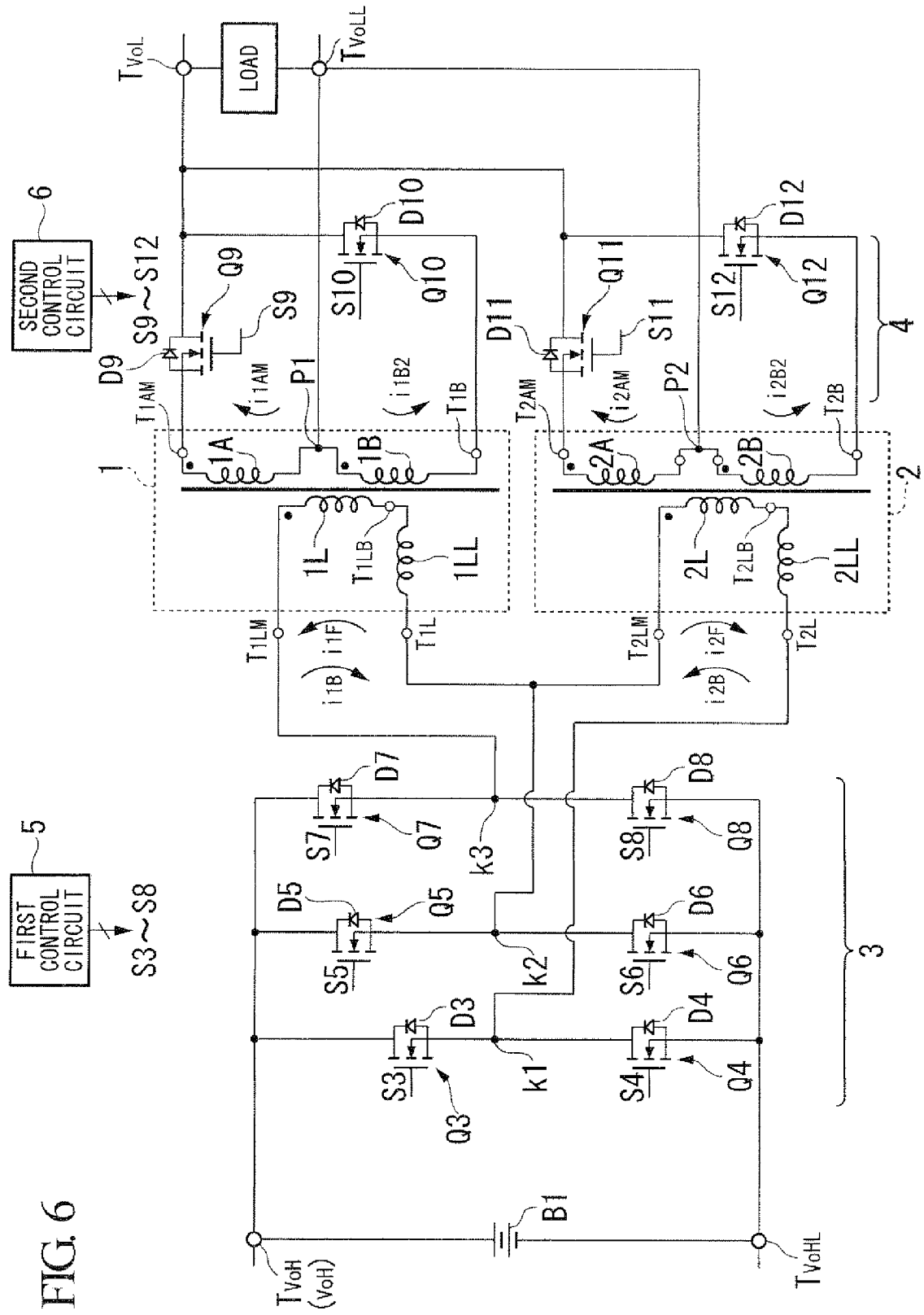
FIG. 6 illustrates a voltage reduction process of the bidirectional DC-DC converter illustrated in FIG. 1.

A voltage reduction process of the bidirectional DC-DC converter according to the present embodiment will be described with reference to FIGS. 6, 7A and 7B. FIG. 6 illustrates a configuration of the DC-DC converter illustrating the voltage reduction process from the high voltage to the low voltage by the bidirectional DC-DC converter according to the present embodiment. The voltage reduction process from the high voltage to the low voltage refers to a process to convert the voltage of 100V into the voltage of the several volts, for example. The primary side orthogonal transforming section 3 performs the voltage reduction process through phase control. The secondary side orthogonal transforming section 4 performs midpoint full-wave rectification to the single-phase rectangular wave alternating-current voltage $V_c$ induced in the windings 1A and 1B of the secondary side winding or the single-phase rectangular wave alternating-current voltage $V_d$ induced in the windings 2A and 2B of the secondary side winding. The low voltage is generated in this manner. At this time, the second control circuit 3 outputs the control signals S9 to S12 at the "L" level to the transistors Q9 to Q12. Accordingly, all the transistors Q9 to Q12 are kept off.

FIG. 6 illustrates a configuration in which load, instead of the battery B2, is inserted between the positive terminal $T_{VoL}$ and the negative terminal $T_{VoLL}$ for the voltage reduction process. In FIG. 6, the battery B1 of the high voltage $V_{oH}$ which compensates for the energy is connected to the primary side converting section 3. In the following description, the rectification process rectifies the single-phase rectangular wave alternating-electric current voltage $V_c$ induced in the windings 1A and 1B in the secondary side winding through the midpoint full-wave rectification of the diodes D9 and D10 and of the diodes D11 and D12, and rectifies the single-phase rectangular wave alternating-electric current voltage $V_d$ induced in the windings 2A and 2B in the secondary side winding.

As described above, the rectification process may be performed by a method of rectifying the single-phase rectangular wave alternating-electric current voltage $V_c$ induced in the secondary side winding and the single-phase rectangular wave alternating-electric current voltage $V_d$ induced in the windings 2A and 2B in the secondary side winding in the rectification process in the synchronous rectification which switches transistors Q9 to Q12 in the windings 1A and 1B.

In FIG. 6 used for the following description, the switching cycle to turn the transistors Q5 and Q6 on and off is referred to as cycle T3. The switching cycle to turn the transistors Q3 and Q4 on and off is referred to as cycle T4. The switching cycle to turn the transistors Q7 and Q8 on and off is referred to as cycle T5. The phase shift of the cycles T4 and T5 with respect to cycle T3 is referred to as $\Delta T$. The phase of the cycle T4 is advanced by $\Delta T$ with respect to the cycle T3. On the other hand, the phase of the cycle T5 is delayed by $\Delta T$ with respect to the cycle T3.

For example, the turn ratio between the primary side winding 1L, and the windings 1A and 1B is set to N:1 and, similarly, the turn ratio between the primary side winding 2L, and the windings 2A and 2B is set to N:1.

<A Case in which Phases of the Cycles T3, T4 and T5 are Shifted by 180 Degrees (=$\Delta T$): FIG. 7A>

At the time $t_1$, the first control circuit 5 changes the control signals S4, S5 and S8 from the "L" level to the "H" level, and changes the control signals S3, S6 and S7 from the "H" level to the "L" level.

By changing the control signals in this way, the transistors Q4, Q5 and Q8 are turned on and the transistors Q3, Q6 and Q7 are turned off.

Accordingly, the electric current $i_{1F}$ flows through the primary side winding 1L (from the terminal $T_{1L}$ to the terminal $T_{1LM}$). The electric current $i_{2F}$ flows through the primary side winding 2L (from the terminal $T_{2LM}$ to the terminal $T_{2L}$). Accordingly, a voltage (voltage value $V_3$: $(1/N)V_{oH}$) is induced in the windings 1B and 2A. On the other hand, a voltage (the voltage value $V_4$: $-(1/N)V_{oH}$) having a polarity opposite to that of the voltage induced in the windings 1B and 2A is induced in the winding 1A and winding 2B.

The voltage induced in the winding 1B (voltage value $V_3$: $(1/N)V_{oH}$) is output to a positive terminal $T_{VoL}$ via a diode D10. Similarly, the voltage induced in the winding 2A (voltage value $V_3$: $(1/N)V_{oH}$) is output to a positive terminal $T_{VoL}$ via a diode D11.

As a result, the low voltage $V_{oL}$ smoothed by the inductance of the leakage inductor 1LL of the transformer 1 and the leakage inductor 2LL of the transformer 2 is output between the positive terminal $T_{VoL}$ and the negative terminal $T_{VoLL}$.

As a result, the voltage induced in the winding 1A (voltage value $V_3$: $(1/N)V_{oH}$) is output to the terminal $T_{VoL}$ and the voltage induced in the winding 2B (voltage value $V_3$: $(1/N)V_{oH}$) is output to the terminal $T_{VoL}$.

No choke coil is used to smooth the voltage. In the present embodiment, the leakage inductance of the primary side winding of the transformers 1 and 2 is used in order to smooth the voltage.

At the time $t_2$, the first control circuit 5 changes the control signals S3, S6 and S7 from the "L" level to the "H" level and changes the control signals S4, S5 and S8 from the "H" level to the "L" level.

As described above, by changing the control signals in this way, the transistors Q3, Q6 and Q7 are turned on and the transistors Q4, Q5 and Q8 are turned off.

Accordingly, the electric current $i_{1B}$ flows into the primary side winding 1L (from the terminal $T_{1LM}$ to the terminal $T_{1L}$), and the electric current $i_{2B}$ flows into the primary side winding 2L (from the terminal $T_{2L}$ to the terminal $T_{2LM}$). As a result, the voltage (voltage value $V_3$: $(1/N)V_{oH}$) is induced in the windings 1A and 2B. On the other hand, the voltage (voltage value $V_4$: $-(1/N)V_{oH}$) is induced in the windings 1B and 2A.

The voltage induced in the winding 1A (voltage value $V_3$: $(1/N)V_{oH}$) is output to the positive terminal $T_{VoL}$ via the diode D9. Similarly, the voltage induced in the winding 2B (voltage value $V_3$: $(1/N)V_{oH}$) is output to the positive terminal $T_{VoL}$ via the diode D12.

Accordingly, the low voltage $V_{oL}$ smoothed by the inductance of the leakage inductor 1LL of the transformer 1 and the leakage inductor 2LL of the transformer 2 is output between the positive terminal $T_{VoL}$ and the negative terminal $T_{VoLL}$.

<A Case in which the Phases Between the Cycle T3, and the Cycles T4 and T5 are Shifted by 90 Degrees ($\Delta T$): FIG. 7B>

Before the time $t_1$, the first control circuit 5 outputs the control signals S4, S5 and S7 at the "L" level and outputs the control signals S3, S6 and S8 at the "H" level. Accordingly, the transistors Q4, Q5 and Q7 are turned off and the transistors Q3, Q6 and Q8 are turn on.

At the time $t_1$, the first control circuit 5 changes the control signal S5 from the "L" level to the "H" level and changes the control signal S6 from the "H" level to the "L" level.

By changing the control signals in this way, the transistor Q5 is turned on and the transistor Q6 is turned off.

At this time, the first control circuit 5 outputs the control signals S3 and S8 at the "H" level and outputs the control signals S4 and S7 at the "L" level.

Accordingly, the transistors Q3 and Q8 are kept on and the transistor Q4 and Q7 are kept off.

As described above, the transistors Q3, Q5 and Q8 are kept on and the transistor Q4, Q6 and Q7 are kept off. Accordingly, the electric current $i_{1F}$ flows into the primary side winding 1L via the transistors Q5 and Q8 (from the terminal $T_{1L}$ to the terminal $T_{1LM}$). On the other hand, since the transistors Q3 and Q5 are kept on, no electric current flows into the primary side winding 2L because of the same electric potential between the terminal $T_{2L}$ and the terminal $T_{2LM}$.

Thus, the electric current $i_{1B2}$ flows into the winding 1B of the secondary side of the transformer 1 and the voltage (voltage value $V_3$: $(1/N)V_{oH}$) is induced in the winding 1B. On the other hand, a voltage of an opposite polarity (voltage value $V_4$: $-(1/N)V_{oH}$) is induced in the winding 1A.

Thus, the voltage induced in the winding 1B (voltage value $V_3$: $(1/N)V_{oH}$) is output to the positive terminal $T_{VoL}$ via the diode D10.

The low voltage $V_{oL}$ smoothed by the inductance of the leakage inductor 1LL of the transformer 1 and the leakage inductor 2LL of the transformer 2 is output between the positive terminal $T_{VoL}$ and the negative terminal $T_{VoLL}$.

At the time $t_{11}$, the first control circuit 5 changes the control signals S4 and S7 from the "L" level to the "H" level and changes the control signals S3 and S8 from the "H" level to the "L" level. At this time, the first control circuit 5 outputs the control signal S5 at the "H" level and outputs control signal S6 at the "L" level.

As described above, the transistors Q4, Q5 and Q7 are kept on and the transistors Q3, Q6 and Q8 are kept off. Accordingly, the electric current $i_{2F}$ flows into the primary side winding 2L via the transistors Q5 and Q4 (from the terminal $T_{2LM}$ to the terminal $T_{2L}$). On the other hand, since the transistors Q5 and Q7 are kept on, no electric current flows into the primary side winding 1L because of the same electric potential between the terminal $T_{1LM}$ and the terminal $T_{1L}$.

Accordingly, the electric current $i_{2AM}$ flows into winding 1B of the secondary side of the transformer 1, a voltage (voltage value $V_3$: $(1/N)V_{oH}$) is induced in the winding 2A and a voltage (voltage value $V_4$: $-(1/N)V_{oH}$) of the opposite polarity is induced in the winding 2B.

As a result, the voltage induced in the winding 2A (voltage value $V_3$: $(1/N)V_{oH}$) is output to the positive terminal $T_{VoL}$ via the diode D11.

The low voltage $V_{oL}$ smoothed by the inductance of the leakage inductor 1LL of the transformer 1 and the leakage inductor 2LL of the transformer 2 is output between the positive terminal $T_{VoL}$ and the negative terminal $T_{VoLL}$.

At the time $t_2$, the first control circuit 5 changes the control signal S6 from the "L" level to the "H" level and changes the control signal S5 from the "H" level to the "L" level.

By changing the control signals in this way, the transistor Q6 is turned on and the transistor Q5 is turned off.

At this time, the transistors Q4 and Q7 are kept on and the transistors Q3 and Q8 are kept off.

As described above, the transistors Q4, Q6 and Q7 are kept on and the transistors Q3, Q5 and Q8 are kept off. Accordingly, the electric current $i_{1B}$ flows into the primary side winding 1L via the transistors Q7 and Q6 (from the terminal $T_{1LM}$ to the terminal $T_{1L}$). On the other hand, since the transistors Q4 and Q6 are kept on, no electric current flows into the primary side winding 2L because of the same electric potential between the terminal $T_{2LM}$ and the terminal $T_{2L}$.

Accordingly, the electric current $i_{1AM}$ flows into the winding 1A of the secondary side of the transformer 1, the voltage (voltage value $V_4$: $(1/N)V_{oH}$) is induced in the winding 1A and the voltage (voltage value $V_4$: $-(1/N)V_{oH}$) of the opposite polarity is induced in the winding 1B.

Accordingly, the voltage induced in the winding 2A (voltage value $V_3$: $(1/N)V_{oH}$) is output to the positive terminal $T_{VoL}$ via the diode D9.

The low voltage $V_{oL}$ smoothed by the inductance of the leakage inductor 1LL of the transformer 1 and the leakage inductor 2LL of the transformer 2 is output between the positive terminal $T_{VoL}$ and the negative terminal $T_{VoLL}$.

At the time $t_{21}$, the first control circuit 5 changes the control signals S3 and S8 from the "L" level to the "H" level, and changes the control signals S4 and S7 from the "H" level to the "L" level.

By changing the control signals in this way, the transistors Q3 and Q8 are turned on and transistors Q4 and Q7 are turned off.

At this time, the transistor Q6 is kept on and the transistor Q5 is kept off.

As described above, the transistors Q3, Q6 and Q8 are kept on and the transistors Q4, Q5 and Q7 are off. Accordingly, the electric current $i_{2B}$ flows into the primary side winding 2L via the transistors Q3 and Q6 (from the terminal $T_{2L}$ to the terminal $T_{2LM}$). On the other hand, since the transistors Q6 and Q8 are kept on, the terminals $T_{1LM}$ and $T_{1L}$ have the same electric potential, and thus no electric current flows into the primary side winding 1L.

Accordingly, the electric current $i_{2B2}$ flows into the winding 2B of the secondary side of the transformer 1, the voltage (voltage value $V_3$: $(1/N)V_{oH}$) is induced in the winding 2B and the voltage (voltage value $V_4$: $-(1/N)V_{oH}$) of opposite polarity is induced in the winding 2A.

As a result, the voltage induced in the winding 2B (voltage value $V_3$: $(1/N)V_{oH}$) is output to the positive terminal $T_{VoL}$ via the diode D12.

The low voltage $V_{oL}$ smoothed by the inductance of the leakage inductor 1LL of the transformer 1 and the leakage inductor 2LL of the transformer 2 is output between the positive terminal $T_{VoL}$ and the negative terminal $T_{VoLL}$.

Figure 7A:
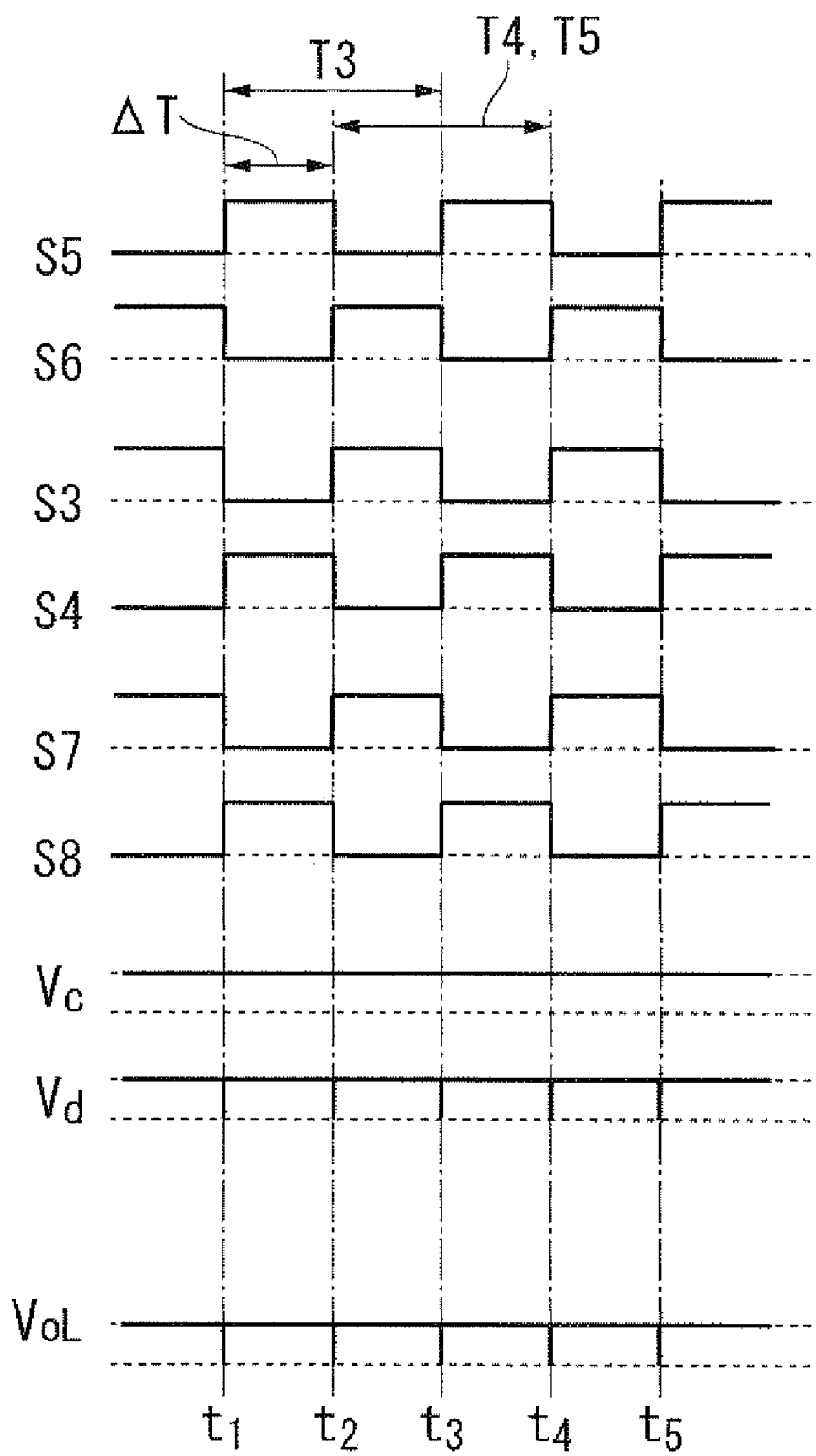
FIG. 7A is a timing chart illustrating the voltage reduction process of the bidirectional DC-DC converter illustrated in FIG. 1.
Figure 7B:
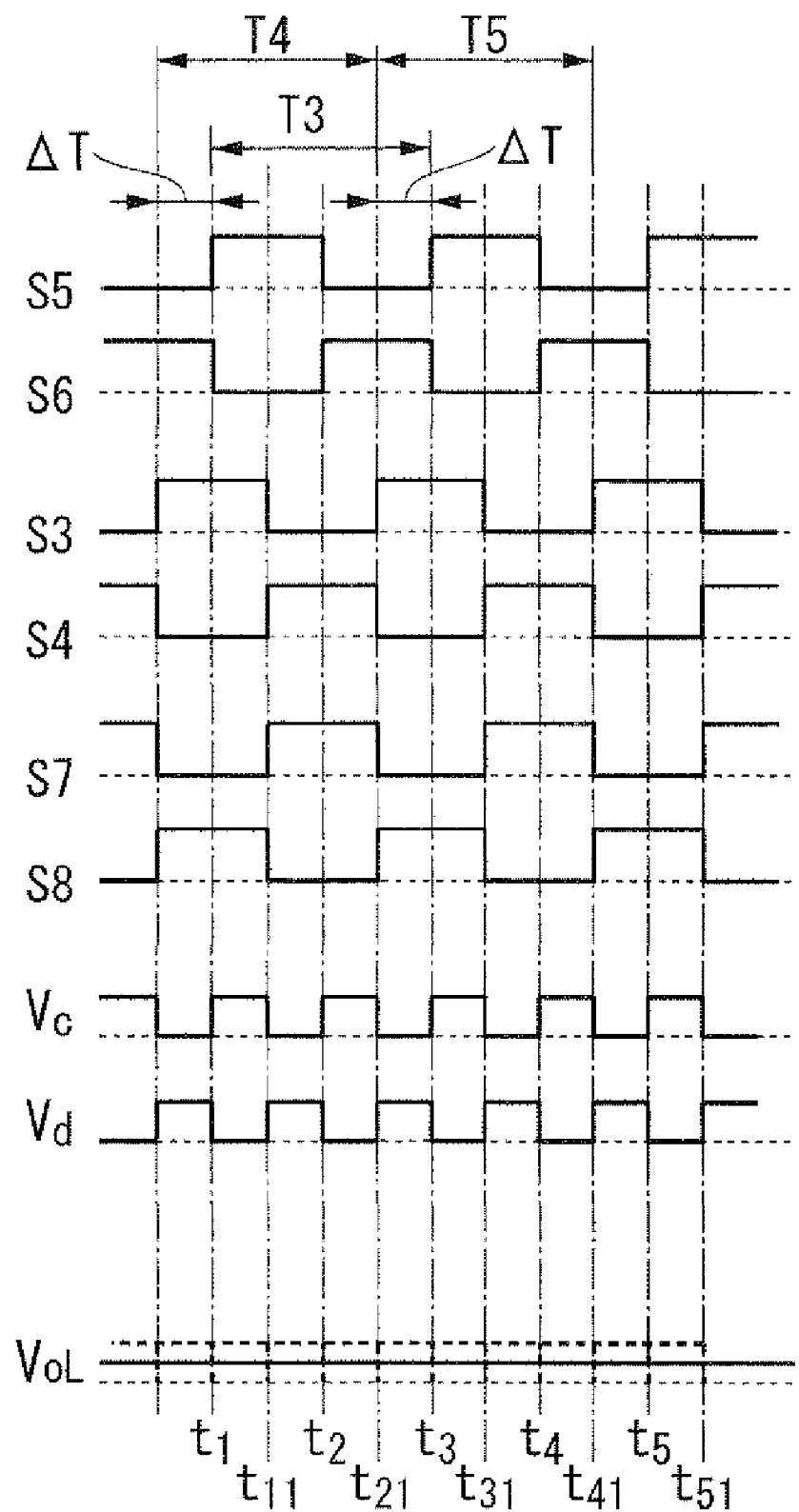
FIG. 7B is a timing chart illustrating the voltage reduction process of the bidirectional DC-DC converter illustrated in FIG. 1.

In the case illustrated in FIG. 7B, since the phases of the cycle T4 and the cycle T5 are shifted by 90 degrees with respect to the cycle T3, the widths of the single-phase rectangular wave alternating-electric current voltages of the transformer 1 and the transformer 2 are half as compared to a case in which the phases are shifted by 180 degrees. In the period in which the voltage width is half, the single-phase rectangular wave alternating-electric current voltage is induced in the secondary side winding. In the secondary side orthogonal transforming section 4, the single-phase full-wave rectification corresponding to the pulse width is performed on the single-phase rectangular wave alternating-electric current voltage and the low voltage $V_{oL}$ of the voltage value corresponding to the phase shift $\Delta T$ is generated.

Also at the times $t_3$ to time $t_{51}$, the similar operation as in the times $t_1$ to $t_{21}$ is performed repeatedly, and a process is performed in which the voltage is decreased from the high voltage to the low voltage through the push-pull operation in the transformers 1 and 2.

In FIG. 7B, the cycle T1 and the cycle T2 have the same length of time and regarding the control signals S5 and S6 and the phases of the control signals S3, S4, S7 and S8, the above-described phase of cycles T4 and T5 are shifted from the phase of the above-described cycle T3 by $\Delta T=90$ degrees.

As illustrated in FIGS. 7A and 7B, with respect to the cycles in which the signal level of the control signals S5 and S6 are changed, the phase shifts of the cycles in which the signal levels of the control signals S3 and S4 and of the control signals S6 and S7 are changed to the "H" level and the "L" level, are changed (i.e., the phase shifts are controlled). In this manner, the length of time in which the electric current flows through the primary side windings 1L and 2L can be controlled, the width of the voltage pulse induced in the secondary side winding can be controlled and the voltage value of the low voltage $V_{oL}$ can be controlled arbitrarily.

In the primary side orthogonal transforming section 3, instead of controlling the length of time during which the electric current flows to the primary side windings 1L and 2L by the phase control, the pulse width of the control signals S3 to S8 may alternatively be controlled. That is, the length of time during which the electric current flows to the primary side windings 1L and 2L may be controlled by the PWM control which controls the pulse width to turn the transistors Q3 to Q8 on and the pulse width to be induced may be controlled.

INDUSTRIAL APPLICABILITY

The present invention can be applied to a bidirectional DC-DC converter. According to the bidirectional DC-DC converter, in a voltage reduction process from a high voltage to a low voltage, a predetermined voltage can be obtained in accordance with a turn ratio and by controlling switching in the same manner as in the related art converters. Moreover, in a voltage increase process from a low voltage to a high voltage, in addition to an increase in voltage in accordance with the turn ratio of the transformers, the voltages induced in each of the primary windings of the two transformers are summed. Accordingly, the voltage can easily be increased to a high voltage value.

The invention claimed is:

1. A bidirectional DC-DC converter which converts a voltage between a high voltage side and a low voltage side, the converter comprising:
   a first transformer which includes a first primary side winding and a first secondary side winding, the first secondary side winding including a first winding and a second winding which are divided at a first midpoint;
   a second transformer which includes a second primary side winding and a second secondary side winding, the second primary side winding being connected in series to the first primary side winding, and the second secondary side winding being connected in parallel to the first secondary winding and including a third winding and a fourth winding which are divided at a second midpoint;
   a first switch which is inserted between a positive terminal at the high voltage side and a junction point of one end of the first primary side winding and one end of the second primary side winding;
   a second switch which is inserted between the junction point and a negative terminal at the high voltage side;
   a third switch which is inserted between an other end of the first primary side winding and the positive terminal at the high voltage side;
   a fourth switch which is inserted between the other end of the first primary side winding and the negative terminal at the high voltage side;
   a fifth switch which is inserted between an other end of the second primary side winding and the positive terminal at the high voltage side;
   a sixth switch which is inserted between the other end of the second primary side winding and the negative terminal at the high voltage side;
   a seventh switch which is inserted between a terminal of the first secondary winding at a side of the first winding and a positive terminal at the low voltage side;
   an eighth switch which is inserted between a terminal of the first secondary winding at a side of the second winding and the positive terminal at the low voltage side;
   a ninth switch which is inserted between a terminal of the second secondary winding at a side of the third winding and the positive terminal at the low voltage side; and
   a tenth switch which is inserted between a terminal of the second secondary winding at a side of the fourth winding and the positive terminal at the low voltage side,
   the first midpoint and the second midpoint being connected to the negative terminal at the low voltage side, and
   the seventh switch, the eighth switch, the ninth switch and the tenth switch respectively connecting the first terminal, the second terminal, the third terminal and the fourth terminal of the secondary winding to the positive terminal at the low voltage side.

2. The bidirectional DC-DC converter according to claim 1, further comprising:
   a second control circuit which controls the seventh to the tenth switches; and a first rectifier circuit which is connected to the first primary side winding and the second primary side winding,
wherein in a voltage increase process,
the second control circuit controls the seventh and the eighth switches such that a connection between the terminal of the first secondary winding at the side of the first winding and the positive terminal at the low voltage side and a connection between the terminal of the first secondary winding at the side of the second winding and the positive terminal at the low voltage side are changed at every first cycle, and the second control circuit performs a push-pull operation in order to cause an electric current to flow through the first primary side winding in opposite directions at every first cycle, and
the second control circuit controls the ninth and the tenth switches such that a connection between the terminal of the second secondary winding at the side of the third winding and the positive terminal at the low voltage side and a connection between the terminal of the second secondary winding at the side of the fourth winding and the positive terminal at the low voltage side are changed at every second cycle, and the second control circuit performs a push-pull operation in order to cause an electric current to flow through the second primary side winding in opposite directions at every second cycle so that a direction of the electric current flowing through the second primary side winding is same as a direction of the electric current flowing through the first primary side winding, and
the first rectifier circuit smoothes sum of voltages induced in the first primary side winding and the second primary side winding which are outputted from the first rectifier circuit and outputs it as a boost voltage.

3. The bidirectional DC-DC converter according to claim 2, wherein the second control circuit phase-controls timings to turn the seventh and the eighth switches on and off, and timings to turn the ninth and the tenth switches on and off so as to set the boost voltage as a predetermined voltage.

4. The bidirectional DC-DC converter according to claim 2, wherein the second control circuit phase-controls timings to turn the seventh and the eighth switches on and off, and timings to turn the ninth and the tenth switches on and off through phase control, and pulse-width controls a time period in which each of the seventh to the tenth switches is turned on, so as to set as a predetermined voltage.

5. The bidirectional DC-DC converter according to claim 1, further comprising:
a first control circuit which controls the first to the sixth switches so as to establish connections between each of the junction point, the second end of the first primary side winding and the second end of the second primary side winding and either of the positive terminal or the negative terminal at the high voltage side;
a second rectifier circuit which is connected to the first winding and the second winding; and
a third rectifier circuit which is connected to the third winding and the fourth winding, an output of the third rectifier being connected in parallel to an output of the second rectifier circuit,
wherein in a voltage reduction process,
the first control circuit controls the first to the sixth switches to turn on and off at every third cycle and causes electric currents to flow through first primary side winding and the second primary side winding in opposite directions at every third cycle,
the second rectifier circuit rectifies voltages generated in the first winding and the second winding,
the third rectifier circuit rectifies voltages generated in the third winding and the fourth winding, and
the DC-DC converter smoothes and outputs a voltage output from the second rectifier circuit and the third rectifier circuit.

6. The bidirectional DC-DC converter according to claim 5, wherein in the voltage reduction process, the first control circuit phase-controls timings to turn each of the first to the sixth switches on and off in accordance with an output voltage having a decreased voltage so as to set the output voltage as a predetermined low voltage.

7. The bidirectional DC-DC converter according to claim 5, wherein in the voltage reduction process, the first control circuit pulse-width controls a time period in which each of the first to the sixth switches is turned on in accordance with an output voltage having a decreased voltage so as to set the output voltage as a predetermined low voltage.

* * * * *